United States Patent
Ichikawa (10) Patent No.: US 10,027,668 B2
(45) Date of Patent: Jul. 17, 2018

(54) INFORMATION PROTECTING APPARATUS

(71) Applicant: BROTHER KOGYO KABUSHIKI KAISHA, Nagoya-shi, Aichi-ken (JP)

(72) Inventor: Kazuki Ichikawa, Gamagori (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 77 days.

(21) Appl. No.: 15/079,100

(22) Filed: Mar. 24, 2016

(65) Prior Publication Data
US 2016/0294830 A1    Oct. 6, 2016

(30) Foreign Application Priority Data

Mar. 31, 2015   (JP) ................................ 2015-071118

(51) Int. Cl.
*H04L 29/06*    (2006.01)
*H04L 29/08*    (2006.01)
*H04L 29/12*    (2006.01)

(52) U.S. Cl.
CPC .......... *H04L 63/10* (2013.01); *H04L 61/2015* (2013.01); *H04L 67/10* (2013.01); *H04L 61/2053* (2013.01); *H04L 61/6022* (2013.01)

(58) Field of Classification Search
CPC . H04L 63/10; H04L 61/2015; H04L 61/2053; H04L 61/6022; H04L 67/10
See application file for complete search history.

(56) References Cited

U.S. PATENT DOCUMENTS

| 7,702,732 B1* | 4/2010 | Squire ................... H04L 41/084 709/206 |
| 2005/0102522 A1 | 5/2005 | Kanda |
| 2008/0072289 A1* | 3/2008 | Aoki ................... H04L 43/0811 726/3 |

(Continued)

FOREIGN PATENT DOCUMENTS

| JP | H05-327696 A | 12/1993 |
| JP | H08-195880 A | 7/1996 |

(Continued)

OTHER PUBLICATIONS

Japanese Official Action dated Apr. 24, 2018 received in related application JP 2015-071118 together with an English language translation.

*Primary Examiner* — Saleh Najjar
*Assistant Examiner* — Louis C Teng
(74) *Attorney, Agent, or Firm* — Scully, Scott, Murphy & Presser, P.C.

(57) ABSTRACT

An information protecting apparatus includes: a storage configured to store data; a communication device configured to perform communication over a network by using first setting information; and a controller configured to control reading and writing of the data from and to the storage. The controller stores the first setting information into the storage. The controller determines whether second setting information is identical to the first setting information stored in the storage. The second setting information is acquired over the network after the first setting information is stored into the storage. The controller restricts the reading and writing of the data from and to the storage when the first setting information and the second setting information are not identical to each other.

6 Claims, 5 Drawing Sheets

(56) References Cited

U.S. PATENT DOCUMENTS

| | | | | |
|---|---|---|---|---|
| 2008/0109539 A1* | 5/2008 | Foster | ............... | H04L 29/12273 709/221 |
| 2010/0122338 A1* | 5/2010 | Kataoka | ............. | H04L 61/2015 726/12 |
| 2010/0253974 A1* | 10/2010 | Hamada | ................ | G06F 3/1204 358/1.15 |
| 2014/0068023 A1* | 3/2014 | Arickan | ............. | H04L 61/2015 709/220 |
| 2014/0122395 A1* | 5/2014 | Nahum | ............... | H04L 41/0886 706/13 |
| 2014/0325615 A1* | 10/2014 | Scahill | ................ | H04L 63/1425 726/4 |
| 2015/0052262 A1* | 2/2015 | Chanda | ............... | H04L 61/2015 709/245 |

FOREIGN PATENT DOCUMENTS

| | | |
|---|---|---|
| JP | 2005-100141 A | 4/2005 |
| JP | 2005-150888 A | 6/2005 |
| JP | 2006-331007 A | 12/2006 |
| JP | 2006-350629 A | 12/2006 |
| JP | 2007-043430 A | 2/2007 |
| JP | 2007-237421 A | 9/2007 |
| JP | 2008-310483 A | 12/2008 |
| JP | 2011-238165 A | 11/2011 |

* cited by examiner

■ Comparison Source Information
• DHCP Setting or another Setting
• IP Address of MFP
• Subnet Mask set for MFP
• Default Gateway set for MFP
• MAC Address of Default Gateway
• IP Address of DHCP Server when IP Address is acquired from DHCP Server
• MAC Address of DHCP Server

INFORMATION PROTECTING APPARATUS

CROSS REFERENCE TO RELATED APPLICATION

The present application claims priority from Japanese Patent Application No. 2015-071118, which was filed on Mar. 31, 2015, the disclosure of which is herein incorporated by reference in its entirety.

BACKGROUND

Technical Field

The following disclosure relates to an information protecting apparatus configured to restrict access to a storage.

Description of the Related Art

There is known an information protecting apparatus for restricting access to a storage. In one example of such information protecting apparatuses, when a predetermined administration server disappears from a network, the information protecting apparatus determines that the information protecting apparatus is stolen and disables its startup to prevent reading and writing of data stored in the information protecting apparatus.

SUMMARY

However, the above-described information protecting apparatus requires the administration server, resulting in increase in the number of devices for operations of the information protecting apparatus, leading to a complicated system configuration.

Accordingly, an aspect of the disclosure relates to an information protecting apparatus configured to restrict access to a storage with a simple configuration when an unauthorized use is expected.

In one aspect of the disclosure, an information protecting apparatus includes: a storage configured to store data; a communication device configured to perform communication over a network by using first setting information; and a controller configured to control reading and writing of the data from and to the storage and control communication using the communication device. The controller is configured to perform: storing the first setting information into the storage; determining whether second setting information is identical to the first setting information stored in the storage, the second setting information being acquired over the network after the first setting information is stored into the storage; and restricting the reading and writing of the data from and to the storage when the controller determines that the first setting information and the second setting information are not identical to each other.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described an embodiment by reference to the drawings.

Configuration

Figure 1:
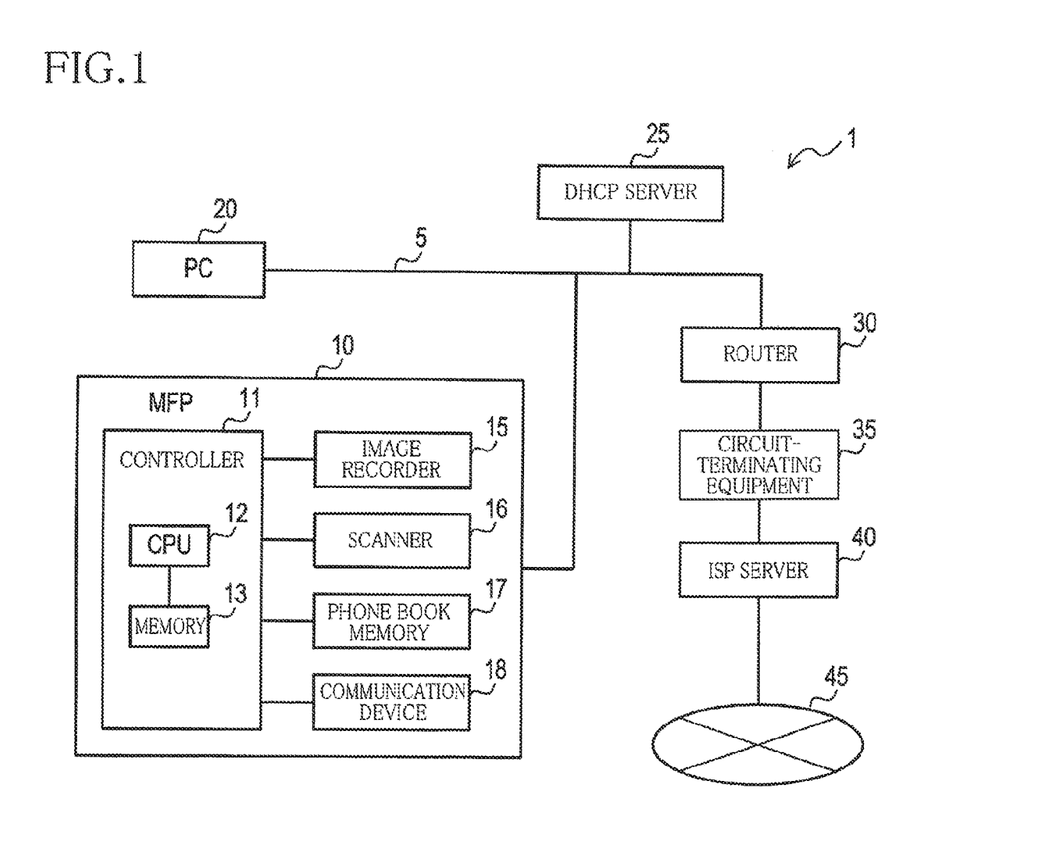
FIG. 1 is a block diagram illustrating a general configuration of a communication system.

As illustrated in FIG. 1, a communication system 1 includes a multi-function printer (MFP) 10, a personal computer (PC) 20, a dynamic host configuration protocol (DHCP) server 25, a router 30, a circuit-terminating equipment 35, and an internet service provider (ISP) server 40. The MFP 10, the PC 20, the DHCP server 25, and the router 30 are connected to each other by a local communication line 5.

The local communication line 5 is configured as a home network, for example, allowing communication according to TCP/IP. It is noted that FIG. 1 (and FIG. 5 which will be described below) illustrates the local communication line 5 in the form of a single communication line for simplicity, but communication lines respectively connected to the MFP 10, the PC 20, and the DHCP server 25 are connected to the router 30 in the present embodiment.

The PC 20 is a well-known personal computer which carries out communication using the local communication line 5. The router 30 is a well-known router and connected also to the circuit-terminating equipment 35. In this communication system 1, the router 30 serves as a default gateway. The circuit-terminating equipment 35 is connected to the ISP server 40 to perform authentication and a relay of data with the ISP server 40.

The ISP server 40 serves as a gateway to an Internet network 45. It is noted that functions of the DHCP server 25, the router 30, and the circuit-terminating equipment 35 may be converged into one or two devices.

The MFP 10 includes a controller 11, an image recorder 15, a scanner 16, a phone book memory 17, and a communication device 18. The phone book memory 17 is one example of a storage. The image recorder 15 records an image on a recording medium such as a sheet. The scanner 16 reads an image, including characters, recorded on a document.

The phone book memory 17 stores phone book information which is used when a facsimile function is used. Examples of the phone book information include a telephone number, a facsimile number, an e-mail address, and an address.

The communication device 18 is configured as an interface for communication via the local communication line 5. The controller 11 includes a CPU 12 and a memory 13 such as a ROM and a non-transitory RAM. The memory 13 is another example of a storage. In the controller 11, the CPU 12 executes processings based on programs stored in the memory 13, whereby the controller 11 controls driving of the devices such as the image recorder 15 and the scanner 16 and controls communication using the communication device 18. The controller 11 executes an information protection process which will be described below to protect information stored in the phone book memory 17.

Processings

Figure 2:
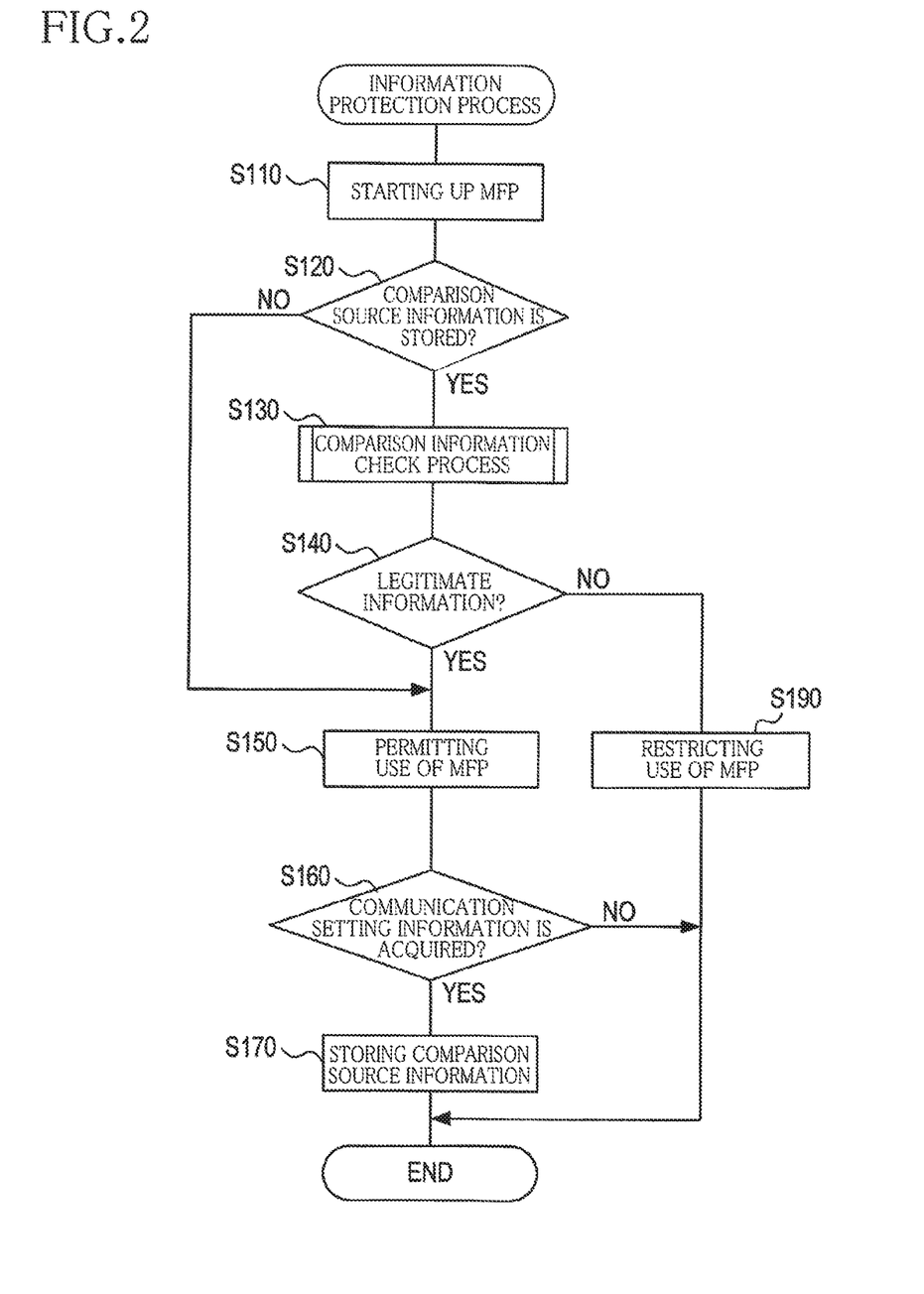
FIG. 2 is a flow chart illustrating an information protection process to be executed by a controller of a multi-function printer (MFP)

In the communication system 1 configured as described above, the controller 11 executes the information protection process illustrated in FIG. 2. The information protection process is started when the MFP 10 is turned on, for example, each time when the MFP 10 is turned on.

Figure 3:
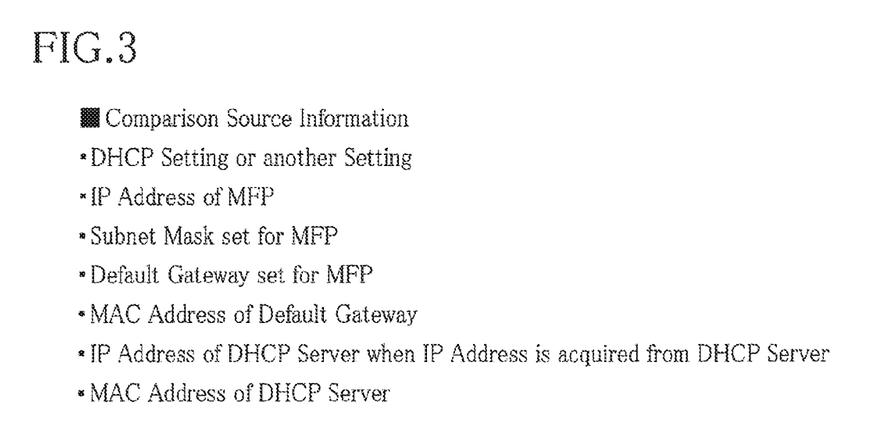
FIG. 3 is a list describing one example of comparison source information stored in the MFP.

As illustrated in FIG. 2, the information protection process begins with S110 at which the MFP 10 is started up. In this processing, the controller 11 executes an initialization processing for switching the image recorder 15 and the scanner 16 to an operable state and making initial settings for communication performed by the communication device 18. In the processing for making the initial settings for the communication, communication setting values as illustrated in FIG. 3 are assigned to the MFP 10, and the MFP 10 acquires these communication setting values. These communication setting values may be hereinafter collectively referred to as "communication setting information" as one example of network setting information. It is noted that the controller 11 acquires the communication setting information after making settings relating to various kinds of networks in a processing at S160 which will be described below when the MFP 10 is used for the first time. In the processing at S110, the controller 11 deletes, from the memory 13, information indicating whether the communication setting information is legitimate information. This information will be explained below.

The controller 11 at S120 determines whether comparison source information is stored in the memory 13. The comparison source information is communication setting information, as one example of first setting information, which is acquired and stored into the memory 13 when the settings relating to various kinds of networks are made in the startup of the MFP 10 to enable communication of the MFP 10 over the networks. That is, the controller 11 determines whether the communication setting information as illustrated in FIG. 3 is stored in the memory 13.

When no comparison source information is stored (S120: NO), this flow goes to S150. When the comparison source information is stored (S120: YES), the controller 11 executes a comparison information check process at S130.

Figure 4:
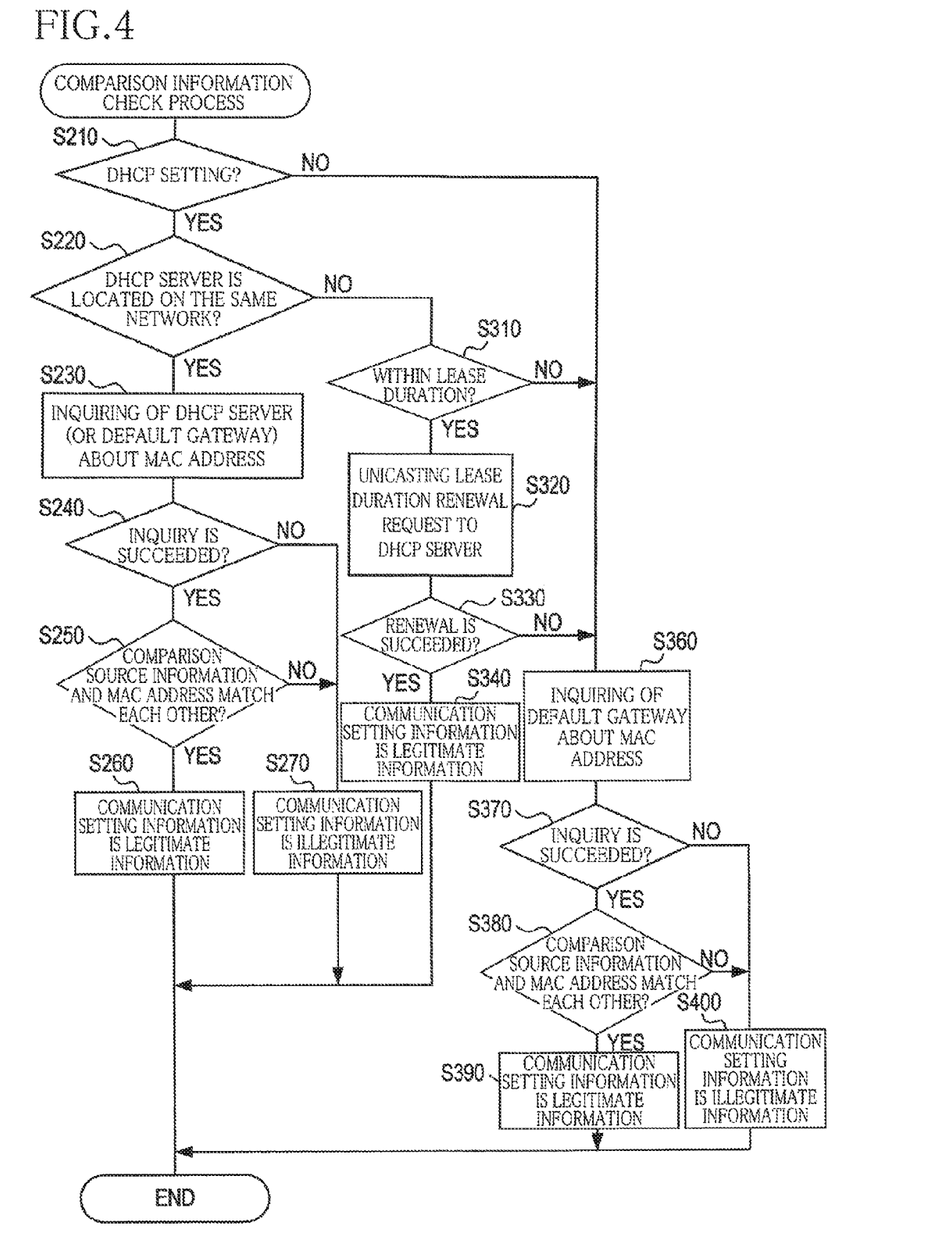
FIG. 4 is a flow chart illustrating a comparison information check process of the information protection process.

The comparison information check process is a process for comparing the comparison source information and communication setting information newly acquired (as one example of second setting information) to set whether a use of the information stored in the phone book memory 17 is allowed depending upon a result of the comparison. As illustrated in FIG. 4, this comparison information check process begins with the controller 11 at S210 referring to the acquired communication setting information and determining whether the acquired communication setting information is a DHCP setting. When the acquired communication setting information is the DHCP setting (S210: YES), the controller 11 at S220 determines whether the DHCP server 25 is located on the same network as one example of "network on which the information protecting apparatus is located". Here, the same network is a network on which the DHCP server 25 can acquire a response to an inquiry (specifically, generally used commands) about individual identification information (e.g., a MAC address). In the example illustrated in FIG. 1, specifically, the same network is a network from the MFP 10 to the router 30, and the DHCP server 25 is connected between the MFP 10 and the router 30. Thus, the DHCP server 25 is located on the same network.

Figure 5:
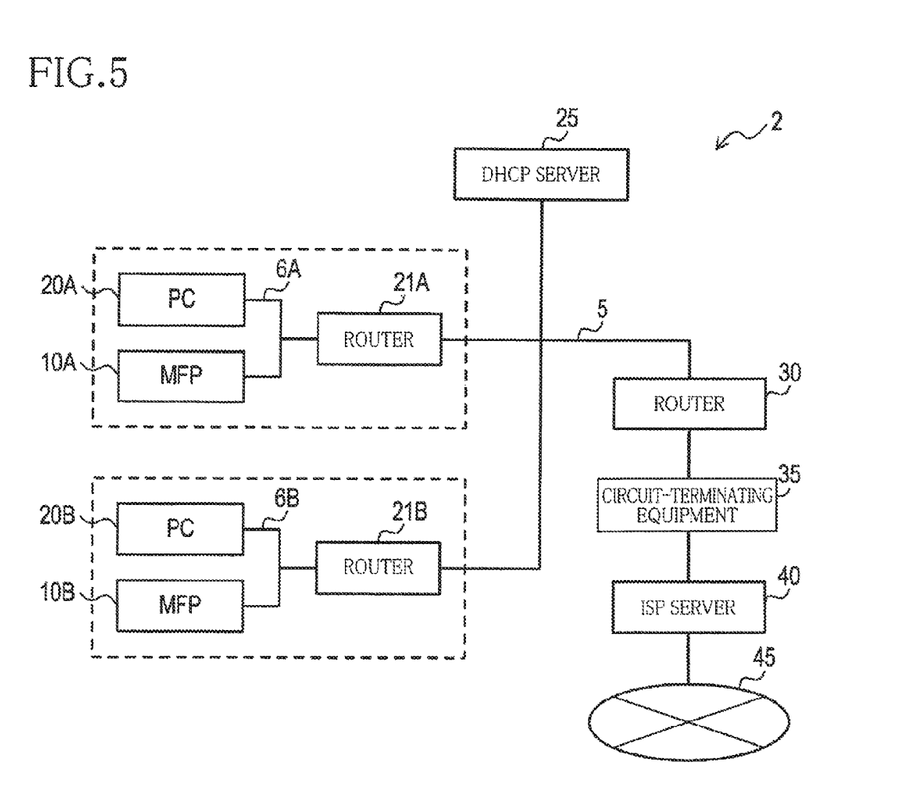
FIG. 5 is block diagram illustrating a general structure a communication system as another example.

In the example illustrated in FIG. 5, for example, the DHCP server 25 is connected to a different network. That is, a communication system 2 illustrated in FIG. 5 includes a first network and a second network. The first network contains an MFP 10A, a PC 20A, and a router 21A, and the second network contains an MFP 10B, a PC 20B, and a router 21B. These networks are connected to a communication line 5 respectively by routers 21A, 21B.

In the first network, the router 21A and devices connected to a communication line 6A located on a termination side of the router 21A are located on the same network. In the second network, the router 21B and devices connected to a communication line 6B located on a termination side of the router 21B are located on the same network. Accordingly, the DHCP server 25 is not located on a network on which the MFPs 10A, 10B are located. It is noted that the router 21A serves as a default gateway in the first network, and the router 21B serves as a default gateway in the second network.

When the DHCP server 25 is located on the same network (S220: YES), the controller 11 at S230 inquires of the DHCP server 25 about a MAC address. In this processing, the controller 11 may inquire of the default gateway about a MAC address.

The controller 11 at S240 determines whether the inquiry is succeeded. That is, when a response about the MAC address is normally received, the controller 11 determines that the inquiry is succeeded. When the inquiry is succeeded (S240: YES), the controller 11 at S250 compares a MAC address stored as the comparison source information and the MAC address acquired in response to the inquiry. When these MAC addresses are identical to each other (S250: YES), the controller 11 at S260 determines that the newly acquired communication setting information is legitimate information and stores information indicating this determination, into the memory 13, and the comparison information check process ends.

When the inquiry of the DHCP server 25 about the MAC address is not succeeded (S240: NO) or when the MAC address stored as the comparison source information and the MAC address acquired in response to the inquiry are not identical to each other (S250: NO), the controller 11 at S270 determines that the newly acquired communication setting information is illegitimate information and stores information indicating this determination, into the memory 13, and the comparison information check process ends.

When the controller 11 at S220 determines that the DHCP server 25 is not located on the same network (S220: NO), the controller 11 at S310 determines whether an IP address assigned to the MFP 10 is within a lease duration (that is, the controller 11 determines whether the lease of the IP address assigned to the MFP 10 is valid). The lease duration of the IP address is managed by the DHCP server 25 and set for a device on the same network by designating an expiration time.

When the H address assigned to the MFP 10 is within the lease duration (S310: YES), the controller 11 at S320 unicasts a lease duration renewal request to the DHCP server 25. The controller 11 at S330 determines whether the renewal of the lease duration is succeeded.

Here, when the DHCP server 25 receives the lease duration renewal request for an IP address managed thereby, the DHCP server 25 permits the renewal of the lease duration according to the request. However, in the case where the MFP 10 is newly connected to a network under the DHCP server 25, for example, in the event of a theft of the MFP 10, the DHCP server 25 permits a use of the MPF 10 by designating a new IP address. That is, the DHCP server 25 does not permit the renewal of the lease duration according to the request.

In this processing, accordingly, when the lease duration is renewed without a change to the IP address assigned to the MFP 10, the controller 11 determines that the renewal of the lease duration is succeeded, and when a change is made to the IP address assigned to the MFP 10, the controller 11 determines that the renewal of the lease duration is failed.

When the renewal of the lease duration is succeeded (S330: YES), the controller 11 at S340 determines that the newly acquired communication setting information is legitimate information and stores information indicating this determination, into the memory 13, and the comparison information check process ends.

When the controller 11 determines at S210 that the acquired communication setting information is not the DHCP setting (S210: NO), when the controller 11 determines at S310 that the IP address assigned to the MFP 10 is not within the lease duration (S310: NO), or the controller 11 at S330 determines that the renewal of the lease duration is failed (S330: NO), the controller 11 at S360 inquires of the default gateway (i.e., the router 30) about a MAC address.

This processing is effective in the case where the IP address of the default gateway is set statically, for example. The controller 11 at S370 determines whether the inquiry of the default gateway about the MAC address is succeeded.

When the inquiry of the MAC address is succeeded (S370: YES), the controller 11 at S380 compares the MAC address stored as the comparison source information and the MAC address acquired in response to the inquiry with each other. When these MAC addresses are identical to each other (S380: YES), the controller 11 at S390 determines that the newly acquired communication setting information is legitimate information and stores information indicating this determination, into the memory 13, and the comparison information check process ends.

When the inquiry of the default gateway about the MAC address is not succeeded (S370: NO) or when the MAC address stored as the comparison source information and the MAC address acquired in response to the inquiry are not identical to each other (S380: NO), the CPU 11 at S400 determines that the newly acquired communication setting information is illegitimate information and stores information indicating this determination, into the memory 13, and the comparison information check process ends.

Upon the completion of this process, the controller 11 returns to the information protection process in FIG. 2, and the controller 11 at S140 determines whether information indicating that the newly acquired communication setting information is legitimate information is stored in the memory 13. When the information indicating that the communication setting information is legitimate information is not stored in the memory 13 (S140: NO), the controller 11 at S190 restricts a use of the MFP 10. That is, the controller 11 makes a setting for disabling the use of the information stored in the phone book memory 17. Upon completion of the processing at S190, the information protection process ends.

When the information indicating that the communication setting information is legitimate information is stored in the memory 13 (S140: YES), the controller 11 at S150 permits the use of the MFP 10. That is, the controller 11 makes a setting for permitting the use of the information stored in the phone book memory 17.

The controller 11 at S160 determines whether, after the use of the MFP 10 is permitted, new communication setting information is acquired by the user who makes a setting for the various kinds of networks to enable the MFP 10 to use the networks. When the new communication setting information is acquired after the use of the MFP 10 is permitted (S160: YES), the controller 11 at S170 stores the acquired communication setting information into the memory 13 as the comparison source information, and the information protection process ends.

When the new communication setting information is not acquired after the use of the MFP 10 is permitted (S160: NO), the information protection process ends.

Effects

In the communication system 1 as described above, the MFP 10 includes: the memory 13 storing data; the communication device 18 configured to perform communication over a network; and the controller 11 configured to control reading and writing of data from and to the memory 13 and the phone book memory 17 and control communication using the communication device 18. The controller 11 stores a network setting value (which is a value set in the MFP 10 depending upon a state of connection to the network) into the memory 13 as a first setting value (the first setting information) and compares a network setting value acquired from the network as a second setting value (the second setting information) with the first setting value stored in the memory 13. When the first setting value and the second setting value are not identical to each other, the controller 11 limits a use of data stored in the phone book memory 17.

That is, since the network setting value set to the MFP 10 is stored in the memory 13, the controller 11 can compare this network setting value and a network setting value newly acquired. When these network setting values are not identical to each other, the controller 11 restricts the use of the data stored in the phone book memory 17 by expecting an unauthorized use. Accordingly, the MFP 10 can restrict access to the phone book memory 17 with simple configuration in the case where an unauthorized use is expected.

In the MFP 10, the controller 11 stores, as the first setting value, information containing the individual identification information about the DHCP server located on the same network and acquires, as the second setting value, the individual identification information about the DHCP server located on the same network.

That is, in the MFP 10, when the DHCP server is located on the same network on which the DHCP server can acquire a response to the inquiry about the individual identification information, the controller 11 uses the individual identification information about the DHCP server to detect that the MFP 10 is connected to a different network. When the MFP 10 is connected to the different network, the controller 11 determines that there is a possibility of an unauthorized use of the MFP 10.

This processing allows the controller 11 to restrict the use of the data stored in the phone book memory 17 when the DHCP server is located on the same network.

In the MFP 10, the controller 11 stores, as the first setting value, information containing an IP address of the DHCP server not located on the same network and stores the IP address of the DHCP server as the second setting value.

This processing allows the controller 11 to detect a possibility of an unauthorized use by using the IP address of the DHCP server which can be acquired by generally used commands, even when the DHCP server is not located on the same network, that is, even when it is difficult to acquire the individual identification information about the DHCP server.

In the system, for example, each of the network devices such as a plurality of routers is disposed on a corresponding one of layers. When the MFP 10 and the DHCP server are located on different layers, the controller 11 can detect the possibility of an unauthorized use. Also, even in the case where a destination of the MFP 10 to be moved is not designated at a location on the same network, the controller 11 does not detect the possibility of an unauthorized use by designating the destination to a network served by the same DHCP server.

In the MFP 10, the controller 11 acquires the IP address of the DHCP server by transmitting the lease duration renewal request for the IP address by designating the IP address of the DHCP server which is stored in the memory 13.

In this configuration, the controller 11 receives no response from the DHCP server when the acquired IP address and the IP address of the DHCP server which is stored in the memory 13 are different from each other, for example. Even in the case where the lease duration renewal request is transmitted to another DHCP server assigned with the same IP address by chance, the renewal of the lease duration is in most cases is not approved, and a different IP address is assigned.

Accordingly, in the MFP 10, the controller 11 can detect a possibility of an unauthorized use due to the DHCP server not located on the same network.

In the MFP 10, the controller 11 stores information containing individual identification information about the default gateway as the first setting value and acquires the individual identification information about the default gateway as the second setting value when there is no DHCP server on the network.

That is, when there is no DHCP server, and the IP address is set statically, the controller 11 uses the individual identification information about the default gateway to detect the possibility of an unauthorized use. With this processing, when the IP address is set statically, the controller 11 can reliably detects the possibility of an unauthorized use.

The MFP 10 has the image forming function for forming an image on the recording medium. This configuration enables the apparatus having the image forming function to have an information protecting function.

Modifications

While the embodiment has been described above, it is to be understood that the disclosure is not limited to the details of the illustrated embodiment, but may be embodied with various changes and modifications, which may occur to those skilled in the art, without departing from the spirit and scope of the disclosure. For example, a function of one device may be divided among a plurality of devices, and a single device may have functions of a plurality of devices.

The present disclosure may be implemented in the form of not only an information protecting apparatus, i.e., the MFP 10, but also a system including the information protecting apparatus, i.e., the communication system 1, a program for functioning a computer as the information protecting apparatus, a non-transitory storage medium storing the program, and an information protecting method, for example.

The controller 11 disables the use of the phone book memory 17 to restrict the use of the MFP 10 in the above-described embodiment but may permit a use of a portion of information about the phone book memory 17 and disable a use of another portion of the information, for example. Also, the controller 11 may restrict another function by restricting a use of the image recorder 15 or the scanner 16, for example.

Each of the communication systems 1, 2 includes the DHCP server 25 but may not include the DHCP server 25. The information protecting apparatus is applied to the MFP 10 in the above-described embodiment but may be applied to other kinds of apparatuses as long as the apparatuses have a communication function.

These modifications can achieve the same effects as achieved in the above-described embodiment.

What is claimed is:

1. An information protecting apparatus, comprising:
   a memory configured to store individual identification information of a dynamic host configuration protocol (DHCP) server located on a same network on which the information protecting apparatus is located, the memory being configured to store data to be protected;
   a communication device configured to perform communication over a network; and
   a processor configured to perform:
      starting-up the information protecting apparatus at a first timing;
      determining whether second individual identification information is identical to first individual identification information, the second individual identification information being information acquired from a response to a request for acquiring the second individual identification information, the request being transmitted after the first timing from the information protecting apparatus to a DHCP server located on the same network on which the information protecting apparatus is located at the first timing, the response being received by the information protecting apparatus from the DHCP server, the first individual identification information being stored into the memory before the first timing;
      allowing reading and writing of the data to be protected from and to the memory when the processor determines that the second individual identification information is identical to the first individual identification information; and
      restricting the reading and writing of the data to be protected from and to the memory when the processor determines that the first individual identification information and the second individual identification information are not identical to each other.

2. The information protecting apparatus according to claim 1, wherein the processor is configured to acquire, over the network, information containing IP address of a DHCP server not located on a network on which the information protecting apparatus is located, as the second individual information.

3. The information protecting apparatus according to claim 2, wherein the processor is configured to acquire the IP address of the DHCP server over the network by controlling the communication device to transmit a lease duration renewal request for an IP address by designating the IP address of the DHCP server which is stored in the memory.

4. The information protecting apparatus according to claim 1, wherein the processor is configured to acquire individual identification information about a default gateway as the second individual identification information over the network when there is no DHCP server on the network.

5. The information protecting apparatus according to claim 1, wherein the information protecting apparatus comprises an image forming function for forming an image on a recording medium.

6. The information protecting apparatus according to claim 1, wherein the first individual identification information is stored into the memory in a period of a first-start-up of the information protecting apparatus, the period of the first-start-up occurring before the first timing.

* * * * *